(12) United States Patent
Göltenboth

(10) Patent No.: US 8,607,692 B2
(45) Date of Patent: Dec. 17, 2013

(54) BEVERAGE SYSTEM

(75) Inventor: Frank Göltenboth, Blaustein (DE)

(73) Assignee: WMF Wurttembergische Metallwarenfabrik AG

( * ) Notice: Subject to any disclaimer, the term of this patent is extended or adjusted under 35 U.S.C. 154(b) by 1182 days.

(21) Appl. No.: 11/997,190

(22) PCT Filed: Jul. 21, 2006

(86) PCT No.: PCT/EP2006/007205
§ 371 (c)(1),
(2), (4) Date: Oct. 2, 2008

(87) PCT Pub. No.: WO2007/014653
PCT Pub. Date: Feb. 8, 2007

(65) Prior Publication Data
US 2009/0114099 A1   May 7, 2009

(30) Foreign Application Priority Data
Jul. 29, 2005   (EP) ..................................... 05016579

(51) Int. Cl.
*A47J 31/00* (2006.01)
(52) U.S. Cl.
USPC ............................. 99/290; 99/302 R; 99/307
(58) Field of Classification Search
USPC .................... 99/284, 290, 302 R, 289 R, 307; 222/146.1, 146.2, 146.6; 134/22.11, 134/22.12, 105, 106, 108
See application file for complete search history.

(56) References Cited

U.S. PATENT DOCUMENTS

| | | | |
|---|---|---|---|
| 3,641,918 A * | 2/1972 | Schellgell et al. ............... | 99/279 |
| 4,649,809 A | 3/1987 | Kanezashi | |
| 4,649,908 A | 3/1987 | Ghaly | |
| 4,974,500 A | 12/1990 | Boyd et al. | |
| 5,285,718 A | 2/1994 | Webster et al. | |
| 5,931,080 A * | 8/1999 | Roure Boada ................... | 99/293 |
| 6,073,539 A * | 6/2000 | Triola et al. ..................... | 99/290 |
| 6,926,170 B2 | 8/2005 | Groesbeck | |
| 7,028,603 B1 * | 4/2006 | Gremillion et al. ............. | 99/290 |
| 7,448,314 B2 * | 11/2008 | Ioannone et al. ............... | 99/452 |
| 7,798,054 B2 * | 9/2010 | Evers et al. ..................... | 99/295 |
| 2004/0112917 A1 | 6/2004 | Groesbeck | |
| 2005/0188855 A1 * | 9/2005 | Tang ................................ | 99/279 |

FOREIGN PATENT DOCUMENTS

| | | |
|---|---|---|
| DE | 29816612 | 9/1998 |
| DE | 19960149 | 7/2001 |
| EP | 1352599 | 10/2003 |
| WO | WO-93/10035 | 5/1993 |
| WO | WO-02/02455 | 1/2002 |
| WO | WO-2007/014653 | 2/2007 |

* cited by examiner

*Primary Examiner* — Reginald L Alexander
(74) *Attorney, Agent, or Firm* — Marshall, Gerstein & Borun LLP

(57) ABSTRACT

A beverage system (1) having a coffee machine (2) for preparing and dispensing hot beverages, and a water dispenser (3) for processing and dispensing drinking water the system being inexpensive and requiring little space. The coffee machine (2) and the water dispenser (3) are connected to on other n such a way that at least one functional component of the coffee machine (2) or of the water dispenser (3) can be utilized both for the coffee machine (2) and for the water dispenser (3).

9 Claims, 3 Drawing Sheets

BEVERAGE SYSTEM

CROSS-REFERENCE TO RELATED APPLICATION

The present application claims the benefit of priority of International Patent Application No. PCT/EP2006/007205, filed on Jul. 21, 2006, which application claims priority of EP Patent Application No. 050116579.4, filed Jul. 29, 2005. The entire text of the priority application is incorporated herein by reference in its entirety.

FIELD OF DISCLOSURE

The present disclosure relates to a beverage system comprising a coffee machine.

BACKGROUND

The customers' liking tends, at present, more and more towards light, nonalcoholic beverages and in particular towards water. A great variety of water dispensers is known, which are able to process tap water such that it is suitable for being served as table water, i.e. which are especially able to cool tap water or to add a gas, preferably carbon dioxide or oxygen, thereto. Such water dispensers are known e.g. from DE-U-298 16 612, DE-B-1 99 60 149, WO-A-02/02455 or WO-A-93/10035. However, also in restaurants, coffeehouses, cafeterias or e.g. in the field of office supply and so-called convenience stores there is an increasing demand for tap water which has been processed in this way. The installation of a water dispenser in addition to a coffee machine, which is necessary in any way, will, however, cause costs and require additional space. Although it is already known from the above-mentioned WO93/10035 or from EP-A-1 352 599 to combine various beverage dispensers, the beverages combined have hitherto been only beverages of one type, e.g. cold beverages on a water basis in WO93/10035 or hot beverages in EP 1 352 599.

SUMMARY OF THE DISCLOSURE

It is therefore the object of the present disclosure to provide a beverage system which is able to dispense hot beverages, such as coffee or tea, and water in a structurally simple and inexpensive manner and which requires little space.

The solution according to the present disclosure allows functional components, which are necessary or expedient for the water dispenser as well as for the coffee machine, to be used for both said units so that they have to be provided only once. This saves costs as well as space.

The present disclosure is, however, particularly advantageous insofar as a common cleaning system can be provided for both the coffee machine and the water dispenser.

As can be seen from the prior art (cf. e.g. DE 298 16 612 or DE 199 60 149), it has hitherto been problematic to prevent microbial contamination of the water dispenser. This problem is particularly serious in the case of water dispensers used in public areas. Coffee machines have been equipped with all integrated cleaning system up to now; according to the present disclosure, this cleaning system is used for the water dispenser and solves the hygienic problems of the latter in the best possible way, so that the beverage system according to the present disclosure satisfies all hygienic demands.

Cleaning of the water dispenser will become particularly simple, when the cleaning system works in cooperation with the hot water maker of the coffee machine so that the water dispenser can be rinsed with hot water so as to kill all microorganisms.

It is specially preferred that the water dispenser and the coffee machine have a common housing; this will reduce the space requirement and the costs still further.

BRIEF DESCRIPTION OF THE DRAWINGS

Embodiments of the present disclosure will be explained in detail hereinbelow on the basis of the drawings, in which.

DETAILED DESCRIPTION OF THE PREFERRED EMBODIMENTS

Figure 1:
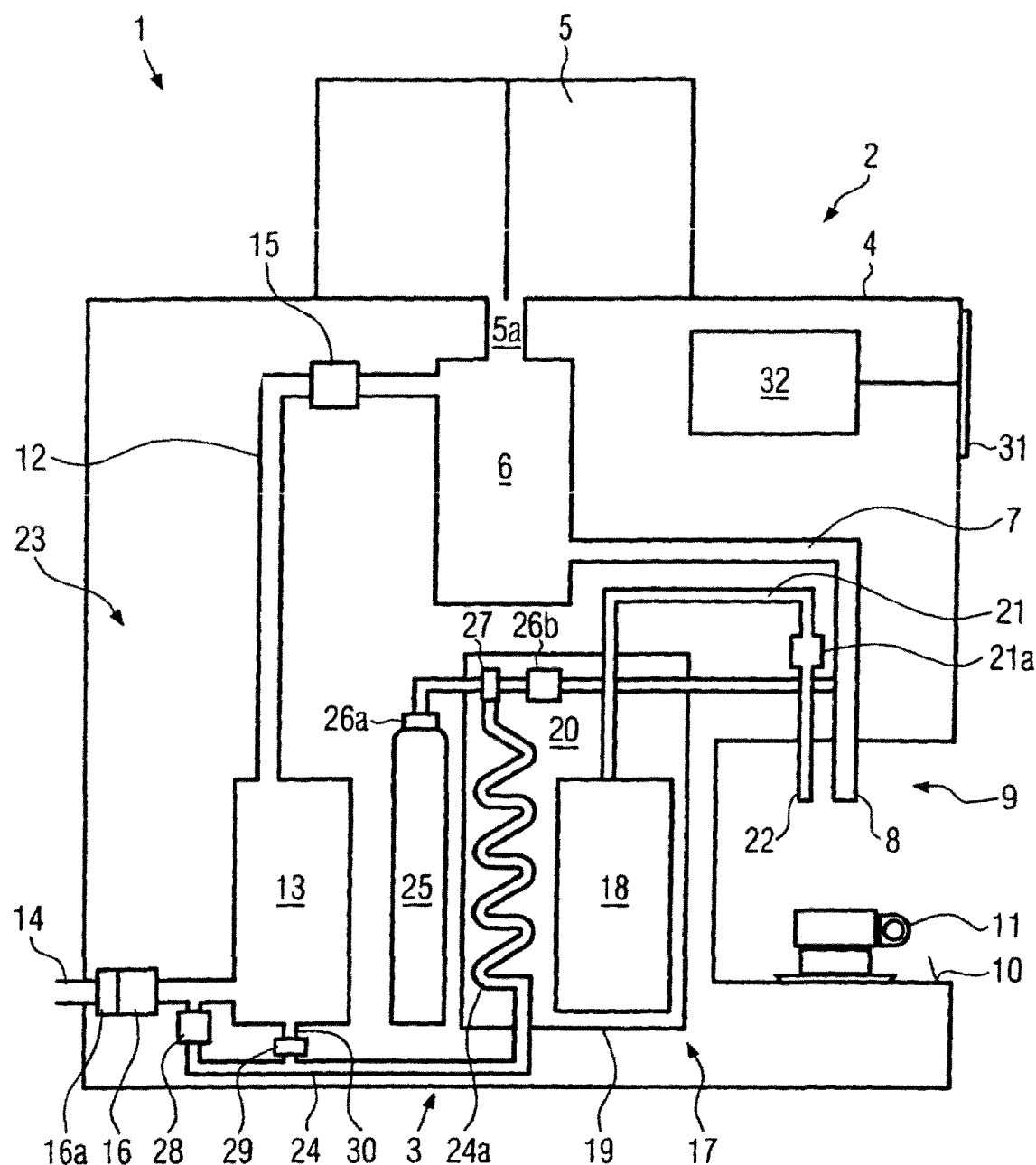
FIG. 1 shows a schematic global view of a beverage system according to the present invention.

FIG. 1 shows a strongly schematic representation of essential components of a beverage system 1 according to the present disclosure. The beverage system 1 comprises a coffee machine 2 and a water dispenser 3, which, in the embodiment shown, are accommodated in a common housing 4. It is, however, also possible to accommodate the coffee machine 2 and the water dispenser 3 in separate housings and to interconnect these housings through conduits in a manner which will be described hereinbelow.

The coffee machine 2 comprises the normal components which are necessary or desirable for automatic coffee makers and which guarantee that the coffee machine 2 prepares and dispenses hot beverages (brewed beverages), e.g. especially coffee, in an automatic or predominantly automatic manner.

In order simplify the representation, the figure only shows a container 35, which contains the raw material for brewed beverages, such as two sorts of coffee beans or coffee grounds for filter coffee and espresso, and which, in the embodiment shown, is placed on top of the housing 4 and is connected to a brewing unit 6 via a supply duct 5a. The brewing unit 6 communicates via a conduit 7 with an outlet 8 which represents part of a discharge means 9 and which is arranged above a surface 10 that can be used for placing thereon a vessel 111 to be filled; the vessel shown here is a cup.

The brewing unit 6 is supplied via a conduit 12 with hot water which is prepared in a hot water maker 13. The hot water maker 13 can e.g. be a boiler or a continuous-flow heater or a hot water maker of some other kind, which is suitable for and used for coffee machines. In the embodiment shown, the hot water maker 13 is connected via a conduit 14 to a cold water supply, which can e.g. be the water mains of the building in question. The hot water conduit 12 has provided therein the usual brewing valve 15 which controls the supply of hot water into the brewing unit 6. Furthermore, a pump 16 can be provided, which causes an increase in pressure, e.g. for the purpose of preparing espresso. In the embodiment shown, the pump 16 is arranged in the cold water conduit 14 upstream of the hot water maker 13. In addition, a water filter 16a can be provided; it will be expedient when this water filter 16a is arranged upstream of the pump 16.

The coffee machine 2 is additionally configured for dispensing milk-containing beverages. These beverages can be mixed beverages containing coffee or tea or they can be dispensed in the form of pure hot or cold milk. The coffee machine 2 comprises a milk preparation unit 17 for this purpose. The unit 17 contains a milk supply 18, which can be arranged in the interior of the housing 4 or outside thereof. The milk supply 18 can be a commercially available retail pack, or it can comprise a separate milk container into the which the retail packs are decanted.

Figure 4:
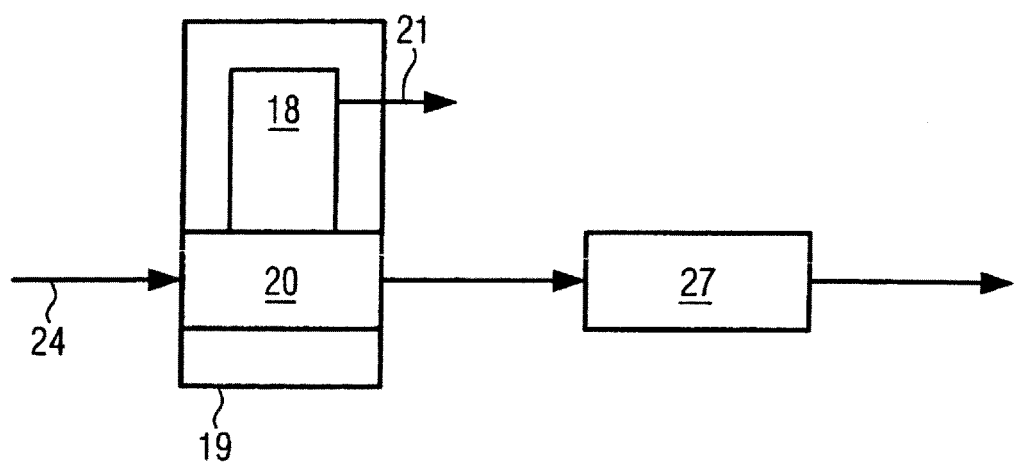
FIG. 4 shows a schematic fragmentary view of specific areas of a beverage system according to the present disclosure.

The milk supply 18 is accommodated in a cooling unit 19 including e.g. a cooling block 20 (FIG. 4). The milk supply 18 additionally communicates via a milk conduit 21 with the discharge means 9 where it terminates preferably in a separate outlet 22. One of the usual foaming units, which is here only indicated by an emulsifying chamber 21*a*, can be provided between the milk supply 18 and the outlet 22. The foaming unit can additionally comprise a possibility of automatically sucking in air (Venturi effect) or of actively blowing in air and of introducing steam. Since foaming units in general are known, a detailed explanation of these units is here dispensed with.

The coffee machine 2 also comprises the usual operating elements 31, which are arranged on the outer side of the housing 4. The operating elements 31 are connected to a control unit 32 controlling, in the manner known, the functions of the coffee machine 2 in accordance with programmed operating sequences in response to a respective actuation of said operating elements 31.

The coffee machine 2 can comprise any known cleaning system 23; in the embodiment shown, the cleaning system 23 includes the hot water maker 13 and a suitably programmed control unit 32, which guarantees that relevant components of the coffee machine 2, e.g. the brewing unit 6 and the outlet 9 as well as, in a manner which is not shown, the milk conduit 21, the emulsifying chamber 21*a* and the milk/milk foam outlet are rinsed with hot water and disinfected. Furthermore, one of the known units for introducing steam and/or for introducing or filling-in a cleaning agent can be provided; the latter is not shown in the drawing.

The water dispenser 3 includes a cold water supply, in the form of a supply conduit 24, and an outlet for dispensing water. It is preferably possible to add a gas, such as carbon dioxide and/or oxygen, to the water. If this is desired, a gas source 25 is additionally provided; in the embodiment shown, a commercially available gas cartridge is used. The gas source 25 is connected via a pressure reducer 26*a* to a carbonizer 27 which introduces gas from the gas source 25 into the water conducted in the conduit 24. The carbonizer 27 in the conduit 24 is followed by a compensating valve 26*b*, which prevents an excessively fast pressure relief of the water/gas mixture that would result in an escape of gas. The usual structural designs can be used for the carbonizer 27, the pressure reducer 26*a* and/or the compensating valve 26*b*; the compensating valve 26*b*, for example, can be operated electrically or manually.

The coffee machine 2 and the water dispenser 3 use functional components in common in accordance with the present disclosure. The beverage system 1 shown is based on a coffee machine so that the water dispenser 3 uses here function components of the coffee machine 2.

In particular, the water conduit 24 branches from the cold water conduit 14 before the latter opens into the hot water maker 13. The water conduit 24 branches off downstream of the pump 16 and the water filter 16*a*, respectively, so that the supply conduit 14, the pump 16 (for increasing the water pressure and for improving gas absorption in this way) and the water filter 16*a* can also be used for the water dispenser 3. The water conduit branch 24 which branches from the cold water conduit 14 has incorporated therein a valve 28 which is opened and closed via the control unit 32 in accordance with a user input. The gas inlet is opened and closed in accordance with a user input as well. Also the user input preferably takes place via the operating elements 31 so that the water dispenser 3 makes also use of the control and operating means of the coffee machine 2, in particular of the control unit 32 and of the operating elements 31.

The water conduit 24 and/or the carbonizer 27 are preferably cooled. In the embodiment shown, this is done in the cooling unit 19 which also comprises the milk supply 18 and the milk conduit 21. The water conduit 24 can be implemented such that is extends through the cooling unit 19 upstream and/or downstream of the carbonizer 27 so as to cool the water au-d so as to improve the gas absorption property above all. For this purpose, the water conduit 24 is e.g. implemented such that, before the carbonizer 27, it extends in the form of a loop through the cooling unit for effecting once-though cooling 24*a*.

The water conduit 24 opens, downstream of the carbonizer 27, into the discharge means 9 either in a separate outlet, or, as shown in the drawing, in a common outlet 8 from which a coffee beverage as well as drinking water can be tapped consequently.

The water dispenser 3 makes use of the cleaning unit 23 of the coffee machine 2 and, for this purpose, it is connected to the hot water maker 13 especially through a conduit 30 which is adapted to be shut off by a valve 29. The conduit 30 should preferably terminate upstream of the carbonizer 27 and as close as possible to the shut-off valve 28 so as to be able to rinse all the areas of the water dispenser 3 with hot water from the hot water maker 13. In addition, a connection to the input of cleaning agents or the like, which is not shown, can be provided.

In FIG. 1 the coffee machine 2 and the water dispenser 3 use a very large number of functional components in common. It is, however, also possible to use only a few, selected functional components in common. Preferred combinations of functional components that are used in common are shown in FIG. 2 to 4.

Figure 2:
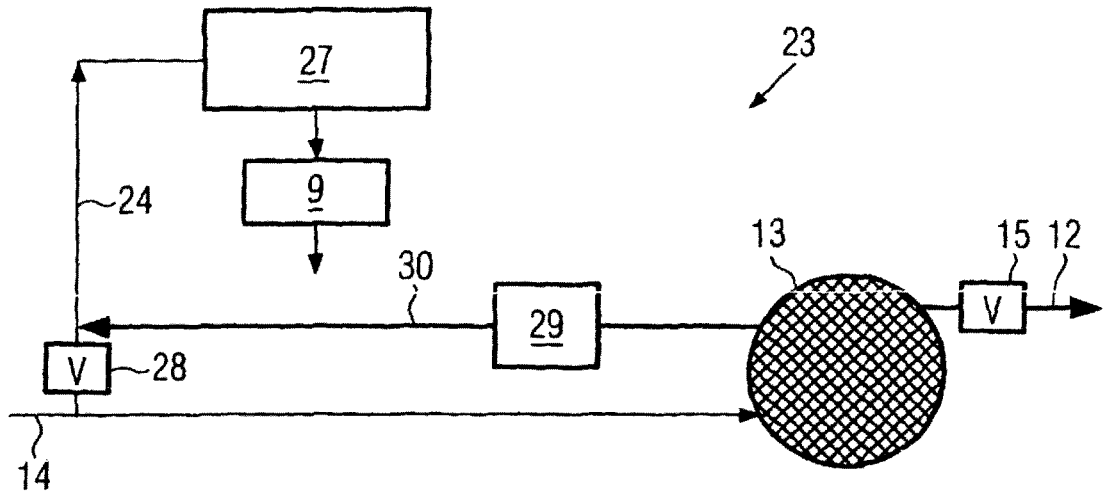
FIG. 2 shows a schematic fragmentary view of specific areas of a beverage system according to the present disclosure.

FIG. 2 shows a extremely expedient and preferred common use of the cleaning unit 23 via the cleaning conduit 30 which leads away from the hot water maker 13 and opens into the water conduit 24 and which includes the shut-off valve 29.

Figure 3:
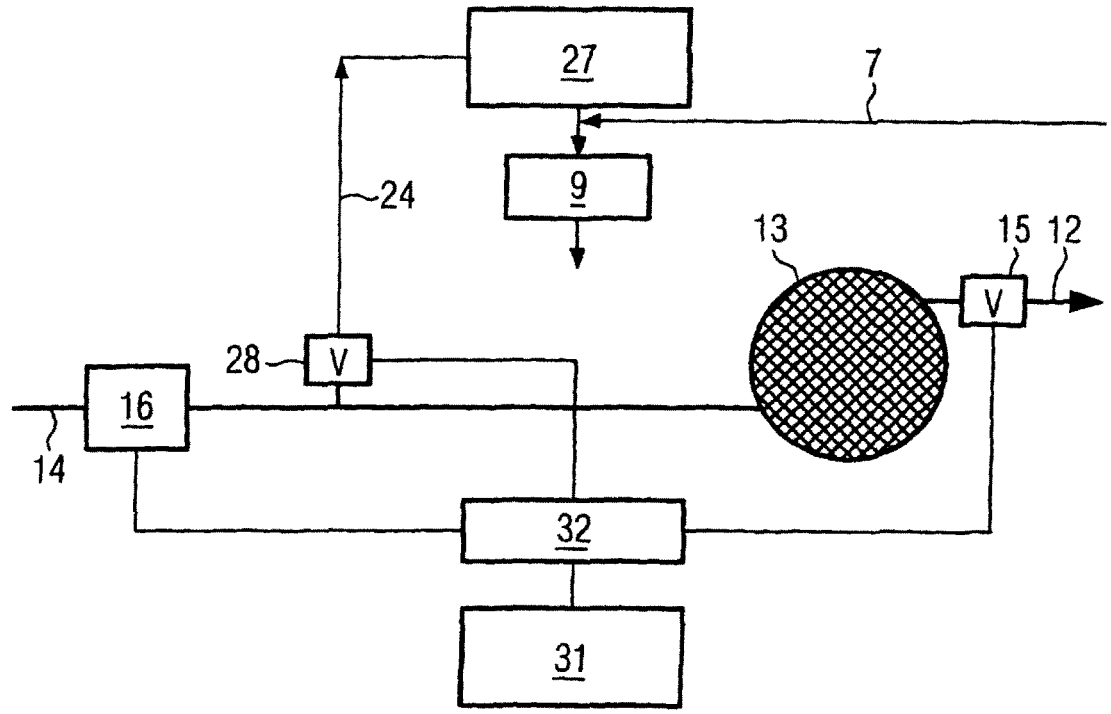
FIG. 3 shows a schematic fragmentary view of specific areas of a beverage system according to the present disclosure.

FIG. 3 shows the common use of the pump 16, the control unit 32 and the operating elements 31.

FIG. 4 shows the common use of the cooling unit 19 including the cooling block 20 used for cooling the milk supply 18 as well as the water in conduit 24, which is conducted through the cooling block 20. It follows that, in the embodiment shown, neither the gas source 25 nor the carbonizer 27 is cooled.

According to modifications of the above-described embodiments shown in the drawings, other combinations of functional components used in common are imaginable as well. It is, however, also possible that the water dispenser includes e.g. a pump so as to increase the water pressure and improve gas absorption, and that this pump is then, in turn, used by the coffee machine as well. If the water dispenser and the coffee machine are accommodated in two separate housings, the necessary connections between the two housings should be releasable so that the two devices can be transported independently of one another.

The invention claimed is:

1. A beverage system comprising a coffee machine for preparing and dispensing hot beverages, and a water dispenser for processing and dispensing drinking water, the coffee machine including:
   a brewing unit for freshly brewing coffee beverage;
   a hot water maker connected to the brewing unit; and
   a cold water conduit connecting the hot water maker to a cold water supply source
   the water dispenser including:
   a cold water supply line connected to the cold water conduit via a cold water valve; and
   the system further comprising:
   a cleaning system containing the hot water maker;
   wherein the cleaning system has a cleaning conduit including a hot water valve and connecting the hot water maker to the cold water supply line downstream of the cold water valve; thereby connecting the coffee machine and the water dispenser to one another in such a way that the cleaning system of the coffee machine or of the water dispenser can be utilized both for the coffee machine and for the water dispenser.

2. A beverage system according to claim 1, and means for supplying fresh water are connected to both the coffee machine and the water dispenser.

3. A beverage system according to claim 2, wherein the means for supplying fresh water comprises one of a supply conduit and a water filter.

4. A beverage system according to claim 1, and one of a control and operating unit are connected to both the coffee machine and the water dispenser.

5. A beverage system according to claim 4, wherein one of the control and operating unit comprise a control unit and a control panel.

6. A beverage system according to claim 1, wherein the water dispenser includes a means for introducing a gas into water, and that a pressure elevating pump is provided, which is connected to both the coffee machine and the gas-introduction means of the water dispenser.

7. A beverage system according to claim 1, and a cooling unit for cooling milk, the cooling unit being connected to the water dispenser so as to cool components of said water dispenser.

8. A beverage system according to claim 1, wherein the water dispenser and the coffee machine have a common housing.

9. A beverage system according to claim 1, wherein the coffee machine and the water dispenser have a common outlet.

* * * * *